US010284077B1

(12) United States Patent
Leisten et al.

(10) Patent No.: US 10,284,077 B1
(45) Date of Patent: May 7, 2019

(54) PFC CONTROLLER PROVIDING REDUCED LINE CURRENT SLOPE WHEN IN BURST MODE

(71) Applicant: Texas Instruments Incorporated, Dallas, TX (US)

(72) Inventors: Joseph Michael Leisten, Cork (IE); Ananthakrishnan Viswanathan, Allen, TX (US); Philomena Cleopha Brady, Corinth, TX (US); Brent Alan McDonald, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/785,757

(22) Filed: Oct. 17, 2017

(51) Int. Cl.
*H02M 1/42* (2007.01)
*H02M 3/157* (2006.01)
*H02M 1/36* (2007.01)

(52) U.S. Cl.
CPC ......... *H02M 1/4225* (2013.01); *H02M 3/157* (2013.01); *H02M 1/36* (2013.01)

(58) Field of Classification Search
CPC .. H02M 1/42–2001/4291; H02M 1/36; H02M 3/158–1588; H02M 2001/0012; H02M 1/082; H02M 1/0845; H02M 3/139; H02M 3/157; H02M 3/33515; H02M 5/2576; H02M 5/273; H02M 7/529; H02M 7/53873; Y02B 70/126; H02P 27/02; Y02P 1080/112
(Continued)

(56) References Cited

U.S. PATENT DOCUMENTS 8,300,438 B1 * 10/2012 Herbert ............... H02M 1/4216
363/124
9,088,223 B2 7/2015 Park et al.
(Continued)

OTHER PUBLICATIONS

V. S. Ram, C. B. Venkatramanan, C. M. Dinesh and R. D. Srinivas, "A study of squirrel cage induction generator using a prototype Vienna rectifier providing variable and constant input voltage," 2013 International Conference on Energy Efficient Technologies for Sustainability, Nagercoil, 2013, pp. 891-895.*
(Continued)

*Primary Examiner* — Gary L Laxton
*Assistant Examiner* — Peter Novak
(74) *Attorney, Agent, or Firm* — Tuenlap Chan; Charles A. Brill; Frank D. Cimino

(57) ABSTRACT

A Power Factor Correction (PFC) controller includes an error amplifier for amplifying a difference between Vout and intended Vout to provide a power demand (Pdem) output at a compensation pin. A burst mode controller includes soft-start circuitry coupled to receive Pdem and to a drive pin which provides pulses to a control node of a power switch of a DC-DC converter during burst periods. The pulses slow ramping of line current over a first 2 to 36 switching cycles at a beginning of bursts when energizing the inductor to reduce a line current slope as compared to without ramping up, and for slowing ramping down of line current over the last 2 to 36 switching cycles to reduce a line current slope when de-energizing the inductor as compared to a line current without ramping down. The PFC controller does not utilize zero-crossings of the line voltage for burst period synchronization.

20 Claims, 7 Drawing Sheets

(58) Field of Classification Search
USPC .................. 363/21.04, 49; 323/241, 283
See application file for complete search history.

(56) References Cited

U.S. PATENT DOCUMENTS

| | | | | |
|---|---|---|---|---|
| 2006/0033650 A1* | 2/2006 | Leung | ............... | H02M 3/33515 |
| | | | | 341/143 |
| 2008/0042632 A1* | 2/2008 | Chapuis | ............... | H02M 3/157 |
| | | | | 323/283 |
| 2011/0122664 A1* | 5/2011 | Yabuzaki | ............... | H02M 1/32 |
| | | | | 363/53 |
| 2015/0280593 A1* | 10/2015 | Ando | ............... | H02M 1/42 |
| | | | | 363/17 |

OTHER PUBLICATIONS

S. Moon, B. Chung, G. Koo, J. Guo and L. Balogh, "A conduction band control AC-DC Buck converter for a high efficiency and high power density adapter," 2017 IEEE Applied Power Electronics Conference and Exposition (APEC), Tampa, FL, 2017, pp. 1771-1777.*
"An optimized simple current sharing function of SRM with intrgrated battery charger for EV drive," 2016 IEEE Transportation Electrification Conference and Expo, Asia-Pacific (ITEC Asia-Pacific), Busan, 2016, pp. 1-5.*

* cited by examiner

PFC CONTROLLER PROVIDING REDUCED LINE CURRENT SLOPE WHEN IN BURST MODE

FIELD

Disclosed embodiments relate to Power Factor Correction (PFC) controllers that have a burst mode.

BACKGROUND

Power converters for medium and high voltage applications are commonly used for converting a first current at a first frequency and a first voltage into a second current at a second frequency and a second voltage. Many types of different power converters are known, such as for converting AC to AC, AC to DC, DC to AC and DC to DC.

A switching regulator is a circuit that includes a controller and a power converter. The power converter includes at least one power phase (or stage) that can comprise a power switch, an inductor, and a diode, or a high-side power transistor and a low-side power transistor connected in series between supply terminals with a converter switching node at the interconnection of the power transistors. The switching node is adapted for connection to an inductor, or 4 power switches per phase with the inductor in between for a buck-boost converter, to transfer energy from the input to the output, where the power switch(es) converts the input voltage to the desired output. The controller and power phase stage(s) are linked by a feedback loop, and the controller supervises the switching operation of the power phase(s) stage by controlling the control node(s) of the power switch (es) to regulate the output voltage to the intended voltage level.

Power Factor Correction (PFC) shapes the input current of the power supply to be synchronized with the mains voltage (line voltage input) to maximize the power drawn from the mains. In an ideal PFC circuit, the input current follows the input voltage as a pure resistor, without any input current harmonics. Although active PFC can be achieved by several converter topologies, the boost converter is the most popular topology used in PFC applications, for several reasons. The line voltage varies from zero to some peak value typically about 375 V so that a stepup (or boost) converter is needed to output a DC bus voltage such as 380 V or more. Accordingly, a buck converter cannot be used. A buck-boost converter also has a high switch voltage stress (Vin+Vout), so that it is also not a common converter choice.

The boost converter has the filter inductor on the input side of the converter, which provides a smooth continuous input current waveform as opposed to the discontinuous input current of the buck or buck-boost topology. The continuous input current is significantly easier to filter, which is a major advantage of the boost converter design because any additional filtering needed on the converter input will increase the cost and reduce the power factor due to capacitive loading of the line.

SUMMARY

This Summary briefly indicates the nature and substance of this Disclosure. It is submitted with the understanding that it will not be used to interpret or limit the scope or meaning of the claims.

It is recognized that during switching operation of a PFC power stage(s) fast rising and falling line current at the start and at the end of each burst period results in unwanted acoustic noise and electromagnetic emissions (EMI). Disclosed embodiments provide PFC burst mode operation with reduced line current slope at the beginning and at the end each burst period by using a soft-start process to ramp up the input current more slowly over the first few switching cycles of each burst period and a soft-stop process to ramp down the input current more slowly over the last few switching cycles of each burst period, where the 'few' switching cycles as used herein refers to 2 to 36 switching cycles, generally ≤10 switching cycles, such as ≤6 switching cycles, or 4 switching cycles in one particular embodiment. Disclosed reduced line current slope prevents the otherwise sharp rising/falling line currents thus helping to prevent unwanted acoustic noise and EMI without any need to utilize line voltage zero-crossings for burst period synchronization to implement.

Disclosed embodiments include PFC controllers including an error amplifier for amplifying a difference between Vout and an intended Vout to generate an error signal that provides a power demand (Pdem) output at a compensation pin. A burst mode controller includes soft-start circuitry coupled to receive Pdem and to a drive pin adapted to be coupled to provide pulses to a control node of a power switch of a DC-DC power converter during burst periods. The pulses are for slowing a ramping of the line current over the first few switching cycles at a beginning of each burst period when energizing the inductor to reduce the line current slope as compared to a line current slope without ramping up, and for slowing a ramping down of line current over the last few switching cycles to reduce the line current slope when de-energizing the inductor as compared to a line current slope with no ramping down.

BRIEF DESCRIPTION OF THE DRAWINGS

Reference will now be made to the accompanying drawings, which are not necessarily drawn to scale, wherein.

DETAILED DESCRIPTION

Figure 1:
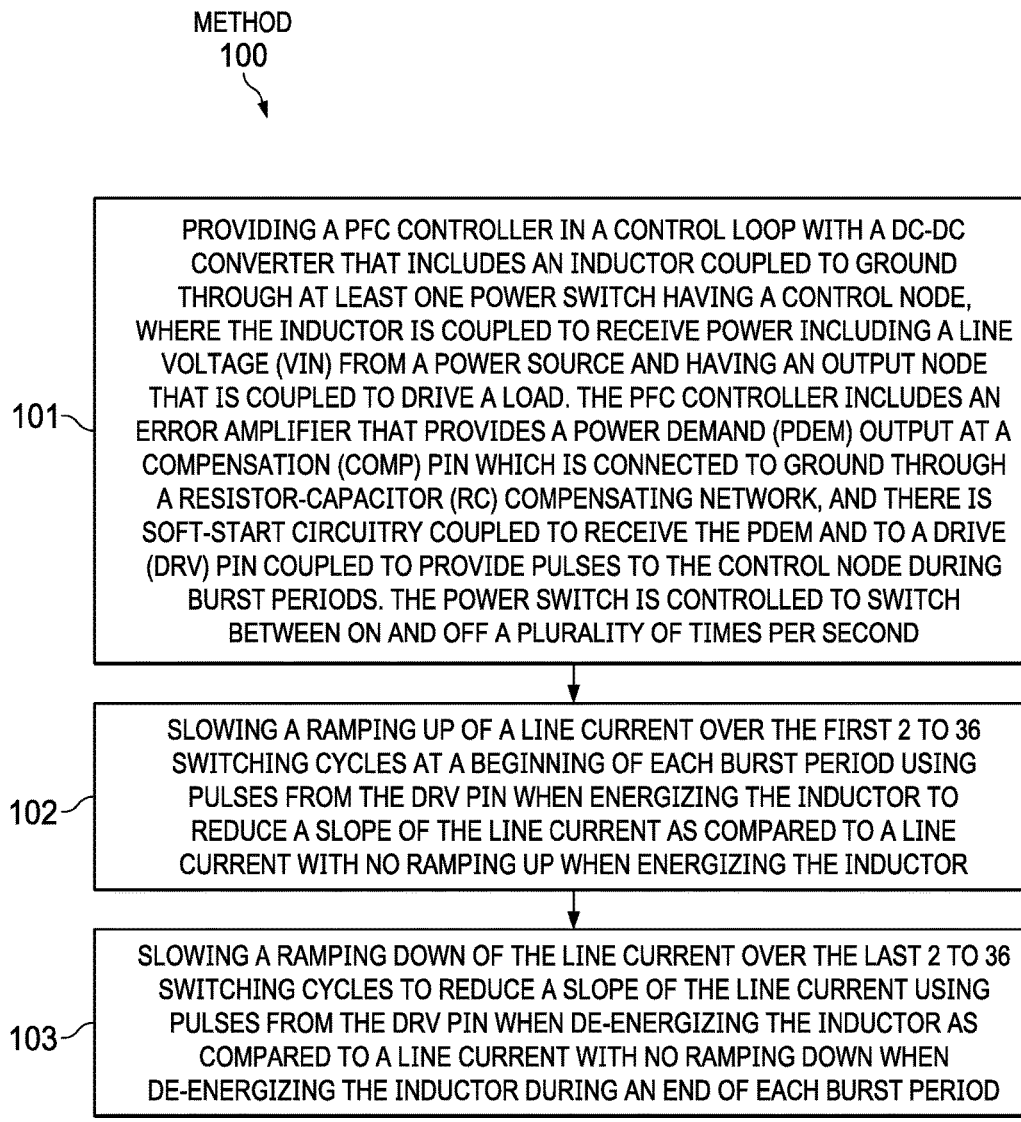
FIG. 1 is a flow chart that shows steps in an example method of reduced line current slope when bursting for PFC of a DC-DC converter that reduces a slope of the line current at the start of and at the end of burst periods, without any need to utilize line voltage zero-crossings for burst period synchronization to implement, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of reduced line current slope when bursting for PFC of a DC-DC converter for reducing a slope of the line current at the start and at the end of burst periods, according to an example embodiment. Although the power source provided to the DC-DC converter is generally an AC power source that is rectified to DC by a rectifying diode bridge, disclosed methods may also be applied when the power source is simply a DC source. As described above, disclosed methods solve the problem of fast rising and falling line current at the start and end of each burst period which as described above results in unwanted acoustic noise and high EMI, without any need to utilize (and thus sense or estimate) the line voltage zero-crossings for burst period synchronization to implement.

Step 101 comprises providing a PFC controller in a control loop with a DC-DC converter that includes an inductor coupled to ground through at least one power switch having a control node, where the inductor is coupled to receive power including a line voltage (Vin) from a power source and having an output node that is coupled to drive a load. The PFC controller includes an error amplifier that provides Pdem output at a compensation (COMP) pin which is connected to ground through a resistor-capacitor (RC) compensating network, and there is soft-start circuitry coupled to receive the Pdem and to a drive (DRV) pin coupled to provide pulses to the control node during burst periods. The power switch is controlled to switch between ON and OFF a plurality (e.g., thousands) of times per second.

Step 102 comprises slowing a ramping up of a line current over the first 2 to 36 switching cycles (typically over a few hundred µsecs) at a beginning of each burst period using pulses from the DRV pin when energizing the inductor to reduce a slope of the line current as compared to the line current without disclosed ramping up when energizing the inductor. (see the start of the burst period for the respective line current waveforms shown in FIG. 2 described below).

Step 103 comprises ramping down of the line current over the last 2 to 36 switching cycles to reduce a slope of the line current using pulses from the DRV pin when de-energizing the inductor as compared to the line current without disclosed ramping down when de-energizing the inductor during an end of each burst period. (see the end of the burst period for the line current waveforms shown in FIG. 2 described below).

In some embodiments, such as pure transition mode (TM) control embodiments, a period of the pulses during the energizing ($T_{ON}$) can be ramped linearly from zero to a value calculated from the Pdem value, and a period of the pulses during the de-energizing ($T_{Off}$) can be ramped linearly from a value calculated from the Pdem to zero. As described above, the first 2 to 36 switching cycles and last 2 to 36 switching cycles may each comprise ≤10 switching cycles, such as ≤6 switching cycles, or 4 switching cycles in one particular embodiment. The PFC control can comprise continuous conduction mode control (CCM), discontinuous-conduction mode (DCM) control, or TM control (also called critical-conduction mode (CrM) control). The DC-DC converter can comprise a boost converter, or another DC-DC converter type.

Figure 2:
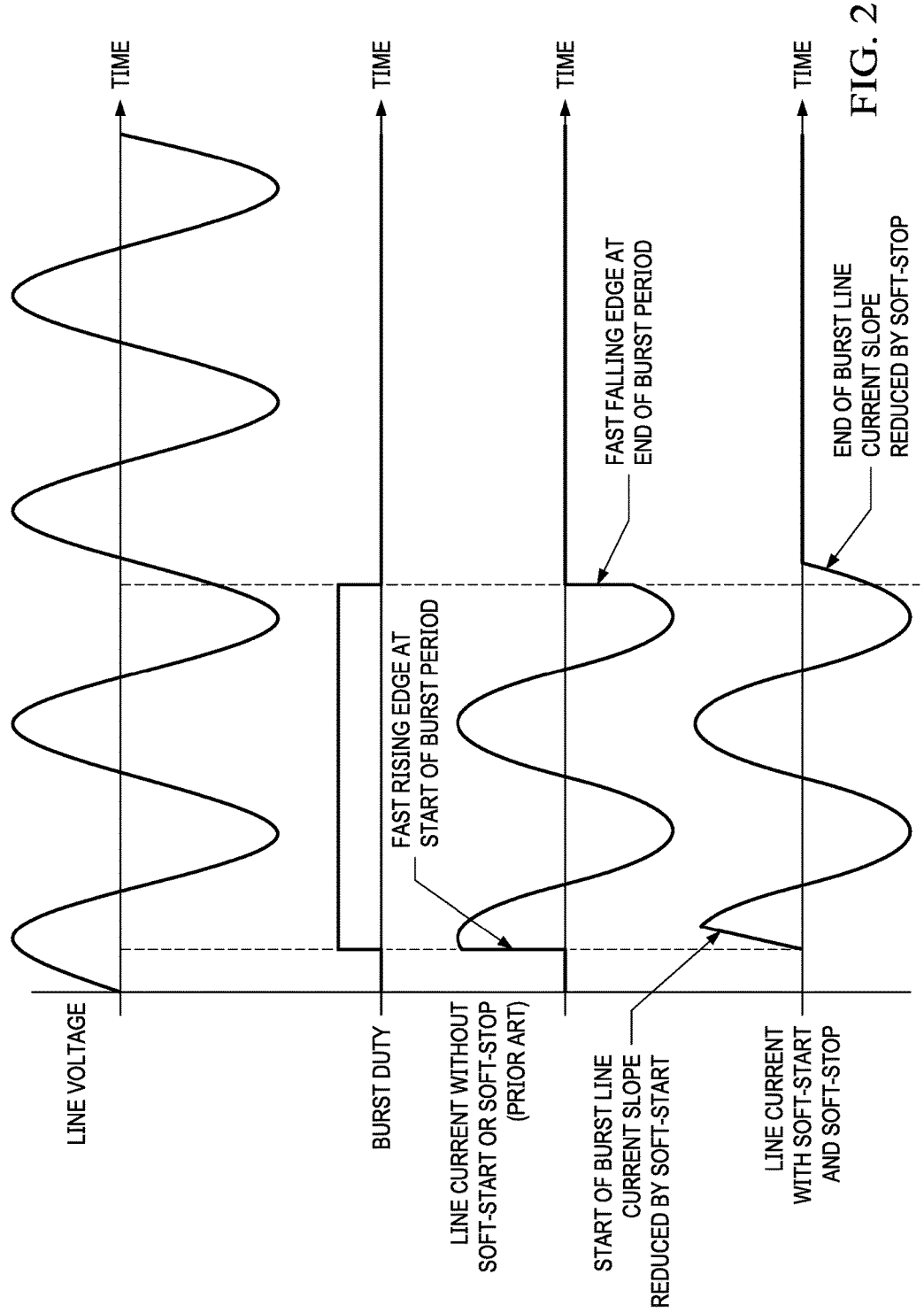
FIG. 2 shows an example plot of line voltage vs. time, the burst period and the resulting line current vs. time from using a disclosed method of reduced line current slope when bursting for PFC of a DC-DC converter, showing reduced line current ramp up and ramp down slopes, according to an example embodiment. For comparison, also shown is a plot of conventional line current vs. time that does not have disclosed soft-start or soft-stop which shows a fast rising edge at the start of the burst period and a fast falling edge at the end of the burst period.

FIG. 2 shows an example plot of line voltage, the burst period (shown as a burst duty cycle), and the resulting line current (the bottom trace) from using a disclosed method of reduced line current slope when bursting for PFC of a DC-DC converter for reducing a slope of the line current at the start and at the end of the burst periods, showing reduced ramp up and ramp down line current slopes, according to an example embodiment. For comparison, also shown is a plot of conventional line current vs. time marked 'prior art' (trace immediately above the bottom trace) that does not have disclosed soft-start or soft-stop which thus has a fast rising edge at the start of the burst period and a fast falling edge at the end of the burst period. It is noted that the line voltage and line current waveforms shown are based on average values that are generally averaged over thousands of switching cycles.

Figure 5:
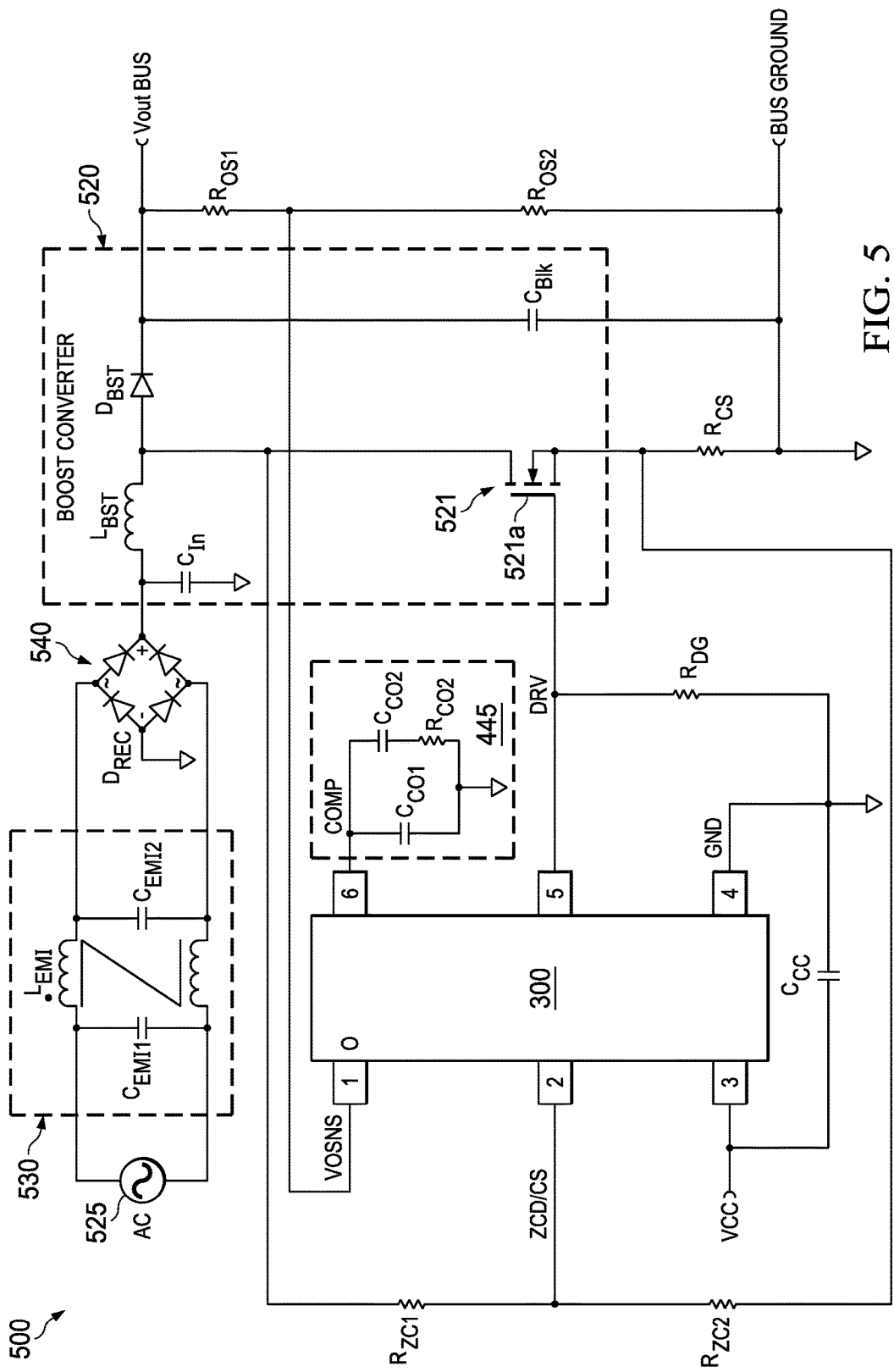
FIG. 5 is an example application schematic showing a switching converter comprising a disclosed PFC controller comprising a burst mode controller including soft-start circuitry in a control loop with a boost converter.

The line current is a filtered version of the inductor current due to action of the capacitor that is coupled to the input side of the inductor which is shown as Cin in FIG. 5 described below, and EMI filter components that may also be present (shown as 530 in FIG. 5). Also the line current on the left side (input side) of the rectifying diode (DRec) bridge 540 shown FIG. 5 is a true AC current signal, not a rectified AC signal. The line voltage is the voltage across the AC power supply (shown as an AC power supply 525 in FIG. 5 described below) and the line current is the current that flows in wires connected to the output of AC power supply 525. Significantly, as described above, to implement disclosed methods of reduced line current slope at the start and end of bursts there is no need to utilize (e.g., by sensing or estimating) the line voltage zero-crossings for the start and the end of the burst periods.

Figure 3:
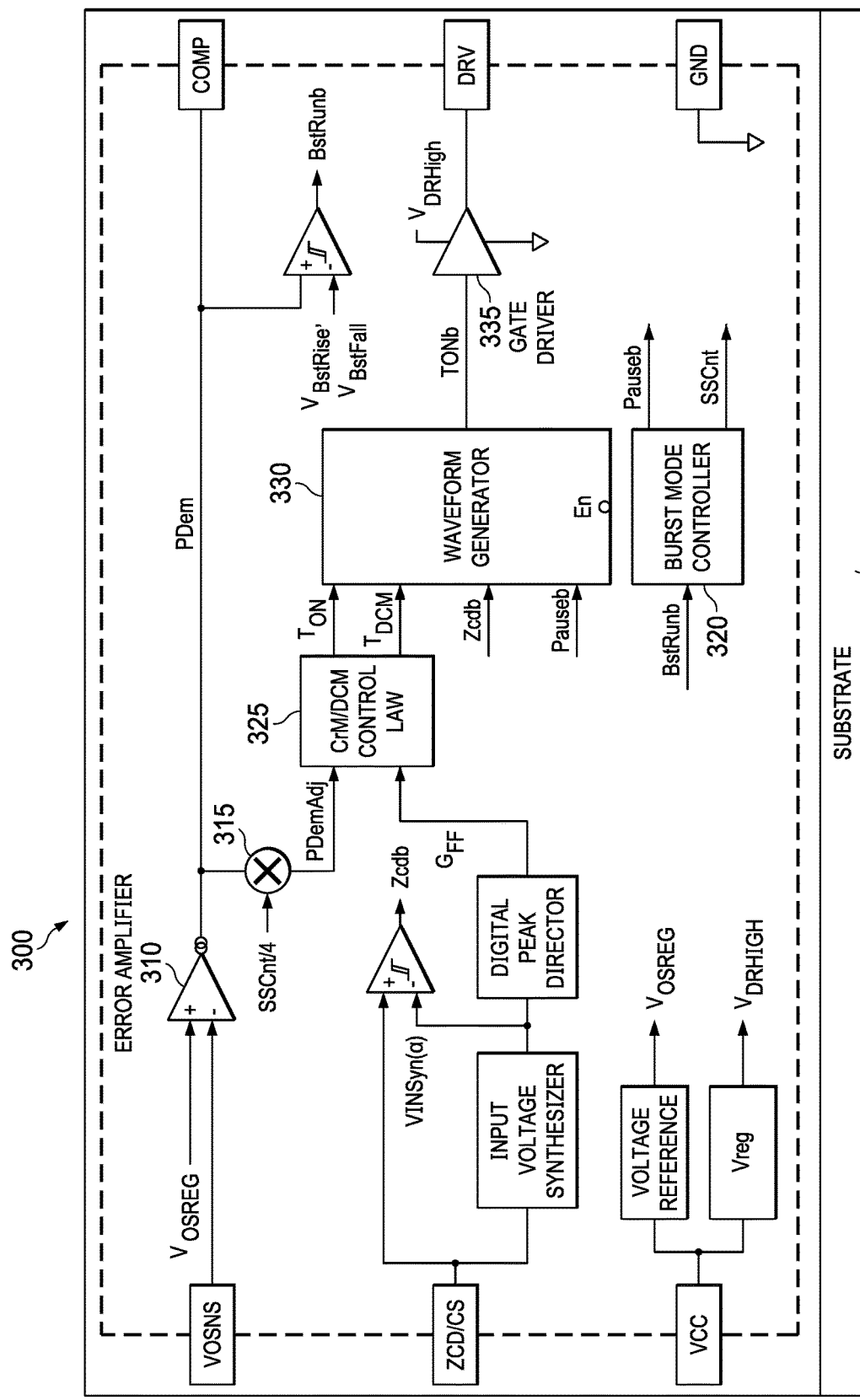
FIG. 3 is a block diagram of a portion of a disclosed PFC controller comprising a burst mode controller including soft-start circuitry for implementing reduced line current slope for a DC-DC converter at the start of the burst period and at the end of the burst period, without any need for circuitry to utilize line voltage zero-crossings for burst period synchronization to implement, according to an example embodiment.

FIG. 3 is a block diagram of a portion of a disclosed PFC controller 300 including a burst mode controller 320 comprising soft-start circuitry for implementing reduced line current slope at the start of burst periods and at the end of burst periods for controlling a DC-DC converter, according to an example embodiment. The PFC controller 300 comprises a substrate 305 having at least a semiconductor surface, typically silicon, and circuitry formed in and on the semiconductor surface. The output of the error amplifier 310 shown is normally a current which can be from a positive voltage level +ve (thus providing a current source) or from a negative voltage level −ve (thus providing a current sink).

This is necessary so that the Pdem value can be increased or reduced as needed to maintain output voltage regulation. The current is thus provided from the COMP (or Vcomp) pin shown, and it develops the present Pdem as a voltage level across the external RC compensation network 445 shown coupled to the COMP pin in FIG. 4A described below. Soft-start circuitry is included in the burst mode controller 320 shown in an example arrangement in FIG. 4A described below.

The PFC controller 300 is shown including a mixer 315, and a control law block 325 that is coupled to a waveform generator 330 then to a gate driver 335. The Soft-Start Count (SSCnt) shown as SSCnt/4 that is shown coupled to an input of the mixer 315 is a variable used to denote the current SSCnt value that can in one particular embodiment be a binary digital value controllable between 0 and 4. Application of the SSCnt input to the mixer 315 provides a soft transition signal at the DRV pin, where the SSCnt input can be generated by the example soft-start circuitry shown in FIG. 4A which is applied between the COMP pin and the control law power demand input of the control law block 325.

The soft-start circuitry of the burst mode controller 320 acts on the current power demand generated by the PFC controller 300. The soft-start circuitry for a pure TM controller will have the effect of linearly ramping $T_{ON}$ (and $T_{off}$), but this may not be true for other types of PFC controllers such as for CCM and DCM operation. For CCM and DCM control in general there is a non-linear relationship between $P_{Dem}$ and $T_{ON}$. This is particularly true for CCM. This non-linearity between $P_{Dem}$ and $T_{ON}$ is however taken care of by the control law block 325 which will differ its actions taken between CCM and DCM controllers. The $T_{ON}$ (and Toff) time is the time when the power switch is ON. During this period the inductor current ramps up linearly and the voltage across the power switch is fixed at zero.

The Pdem value is generated by the error amplifier 310 that performs voltage amplification which amplifies the difference between the sensed (or estimated) actual output voltage from the converter (Vout) and the intended Vout. This amplified difference is applied to an external passive compensation network (filter) coupled to the COMP pin shown as 445 in FIG. 4A in the form of a current signal. The filtered value, in the form of a voltage on the COMP pin, becomes the Pdem. The control law block 325 and waveform generator 330 convert this Pdem into the pulses at the DRV pin which are applied to the power switch(es) of the power converter to achieve delivery of the demanded power by the power circuit. In its simplest form being TM control the control law block 325/waveform generator 330 produces pulses having a pulse width that is proportional to the instantaneous power demand.

FIG. 3 shows the COMP voltage level multiplied by SSCnt/4 to form the output of the mixer 315 shown as PdemAdj. In normal operation SSCnt=4 so that VCOMP=PDem. The number 4 for the SSCnt value is the only parameter needed to implement disclosed methods. One can use a SSCnt number different from 4, but the number selected is generally fixed in the controller design. In operation, when the VCOMP voltage level falls below its boost fall (BstFall) threshold switching pulses are issued from the DRV pin so that the soft-stop state is entered. During the soft-stop period the SSCnt is decremented by 1 on each switching cycle which results in ramping down the Pdem linearly for all control cases. The difference will be in the control law block 325 meaning that a different treatment will occur on $T_{ON}$ to achieve the same result on line current.

Once the SSCnt reaches zero, switching operation is halted meaning the end of the soft-start phase has been reached, so that the power converter stops transferring energy from the input to the output.

When the VCOMP voltage rises above its boost rise (BstRise) threshold switching pulses are issued from the DRV pin so that the soft-start state is entered. During the Soft_Start period SSCnt is incremented by 1 on each switching cycle hence ramping up the Pdem linearly. Once the SSCnt reaches 4, switching operation is halted so the converter stops transferring energy from the input to the output. No controller parameters need to be changed dynamically, and the soft-start and soft-stop process above is generally repeated exactly the same each burst period by the controller issuing switching pulses from the DRV pin that are applied to the control node of the power switch of the power converter.

Figure 4A:
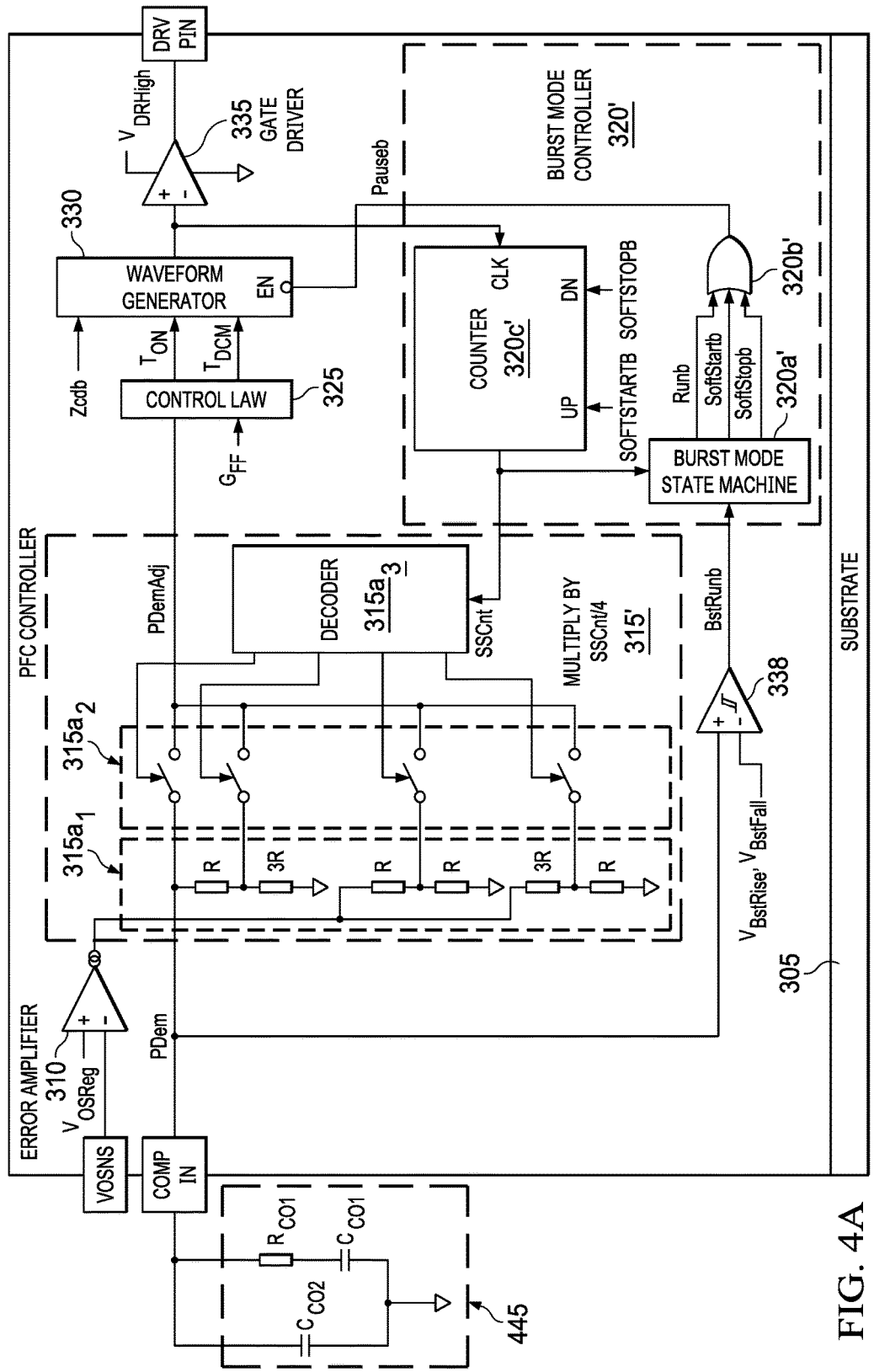
FIG. 4A shows example details for soft-start circuitry for the PFC controller shown in FIG. 3.

FIG. 4A shows example details for the soft-start circuitry for burst mode control for a disclosed PFC controller. As noted above and shown in FIG. 4A (and FIG. 5) an external RC compensation network 445 is generally coupled between the COMP pin and ground. The blocks added to a conventional burst mode controller to realize a disclosed burst mode control block that implements disclosed burst soft-start and soft-stop without the need for line voltage zero crossing information to synchronize the start or end of burst periods includes a multiply by SSCnt/4 Block shown as 315'.

The analog PDem signal at the COMP pin is passed to four resistor dividers 315a1 that are binary weighted (1, ¾, ½, and ¼). A decoder 315a3 and analog multiplexer 315a2 are used to select which resistor divider of the resistor dividers 315a1 is used according to the two bit counter output SSCnt. Burst mode controller 320' comprises a burst mode state machine 320a' that includes two additional new states, SoftStartb and SoftStopb. Runb and BstOffb states are used to implement known burst operation and these are driven by a signal (BstRunb) from a comparator 338 having an input for receiving the COMP pin voltage. The outputs of the burst mode state machine 320a' are coupled to an OR gate 320b' that provides the Pauseb output that is shown coupled to the EN input of the waveform generator 330.

The SoftStopb state comes between the Runb and BstOffb states. During the SoftStopb state the binary counter 320c' counts down from an initial value of 4 to a final value of 1. When a count value of 1 is reached the SoftStopb state exits to the BstOffb state. The SoftStartb state comes between the BstOffb and Runb states. During the SoftStartb state the binary counter 320c' counts up from an initial value of 1 to a final value of 4. When the count value of 4 is reaches the SoftStartb state exits to the Runb state. The binary counter 320c's Clk input is driven by the waveform generator 330 so that the binary counter 320c' is advanced by one count each time a switching cycle occurs.

Figure 4B:
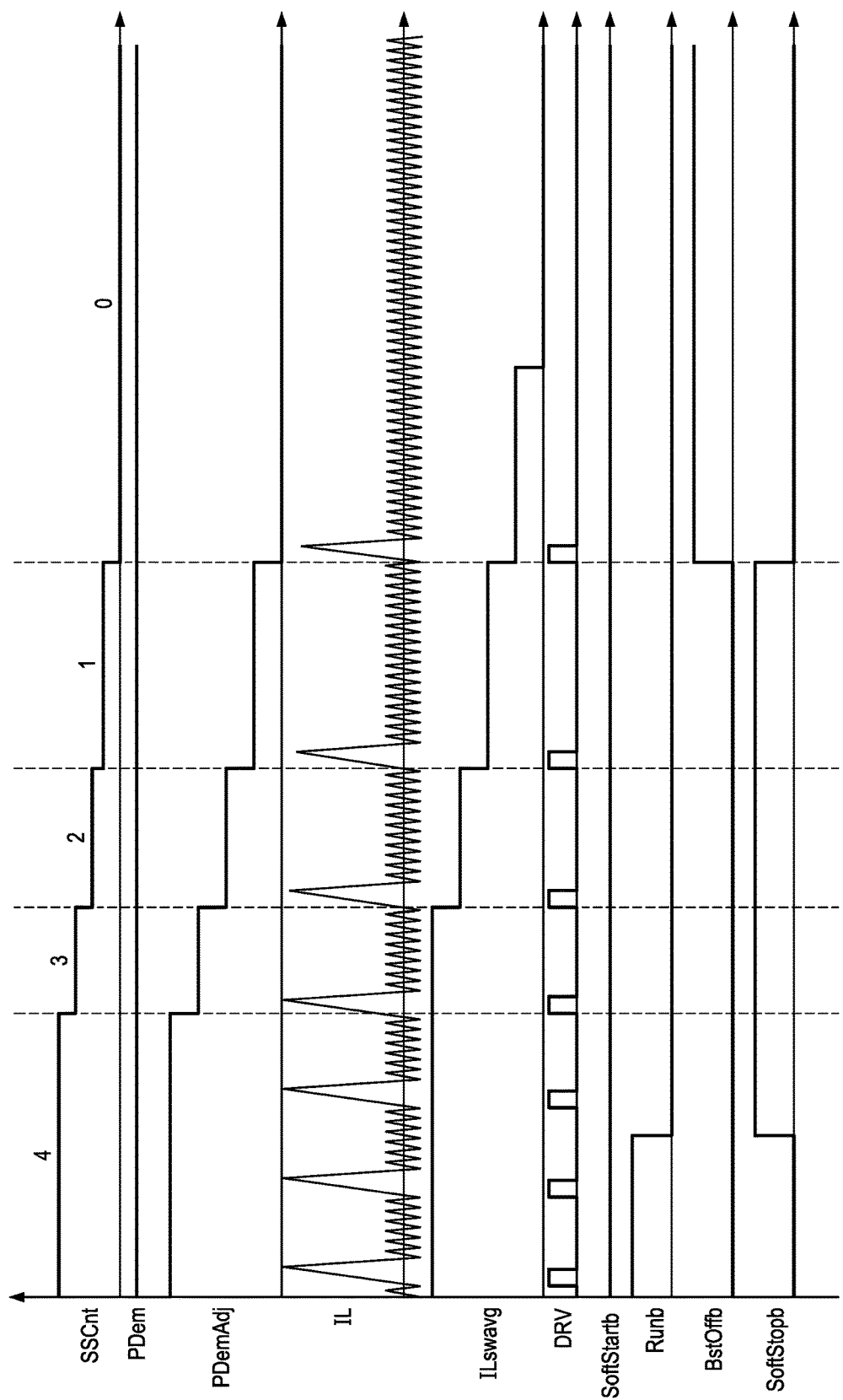
FIG. 4B shows waveforms for various nodes of the PFC controller shown in FIG. 3 and the soft-start circuitry shown in FIG. 4A.

FIG. 4B shows waveforms for some nodes shown in FIG. 4A illustrating operation during the transition from Runb through SoftStopb to BstOffb states. The lower four traces include a digital output for each of the four states (SoftStartb, Runb, BstOffb and SoftStopb). DRV shown above the lower four traces is the waveform at the DRV pin that indicates the DRV pin voltage. A high DRV pin signal indicates that the corresponding state is active and a low DRV pin signal indicates that the state it is inactive. It can be seen that only one state is active at any point in time. The DRV pin voltage is also a digital signal, with a high indicating for a conventional n-channel MOSFET power switch that the MOSFET is ON ($T_{ON}$ period) and a low indicating that the MOSFET is OFF. The trace labeled ILswavg is the switching cycle average of the inductor current $I_L$ that is separated from the other waveforms for clarity. This inductor current waveform is an approximation of the Line current waveform flowing into the PFC stage. This is because the EMI filter (see EMI filter 530 in FIG. 5) removed most of the high frequency content from the inductor current waveform. It is clear from this waveform that the Line current steps down during the SoftStopb period in response to the ramped power demand signal (PDemAdj).

As described above PDem is the power demand level produced by the error amplifier 310 on the COMP pin. PDemAdj is the adjusted power demand level after the action of the SoftStop circuit. This adjusted power demand signal ramps down from PDem to zero in response to the change in SSCnt value during the SoftStopb period. SSCnt represents the output of the binary counter 320c' shown in FIG. 4A.

FIG. 5 is an application schematic showing an example switching converter 500 comprising a disclosed PFC controller 300 in a control loop with a boost converter 520 including an inductor $L_{BST}$ coupled to ground through at least one power switch 521 having a control node 521a shown as a gate, with the inductor $L_{BST}$ coupled to receive power including a line voltage. Vin for the Boost converter is the output of rectifier bridge (DRec) 540 which is a full wave rectified form of the line voltage (AC) from the AC power source 525, with the boost converter 520 having an output node (shown as Vout bus) coupled to drive a load.

An EMI filter 530 is shown between the AC power source 525 and the DRec 540. As described above relative to FIG. 3, and the PFC controller 300 includes an error amplifier that provides a Pdem output at its compensation (COMP) pin which is connected to ground through RC compensating network 445, and burst mode controller 320 including soft-start circuitry is coupled to receive Pdem and to the DRV pin to provide pulses to the control node 521a of the power switch 521 shown as an n-channel MOSFET during burst periods.

Although the power converters are shown herein as having a single power phase with a single power switch, disclosed embodiments also apply to power converters having a plurality of power phases, and also to power converter phases having a high-side power transistor and a low-side power transistor connected in series, or 4 power transistors per phase for a Buck-boost converter, positioned between supply terminals with a converter switching node at the interconnection of the power transistors.

EXAMPLES

Disclosed embodiments are further illustrated by the following specific Examples, which should not be construed as limiting the scope or content of this Disclosure in any way.

Figure 6:
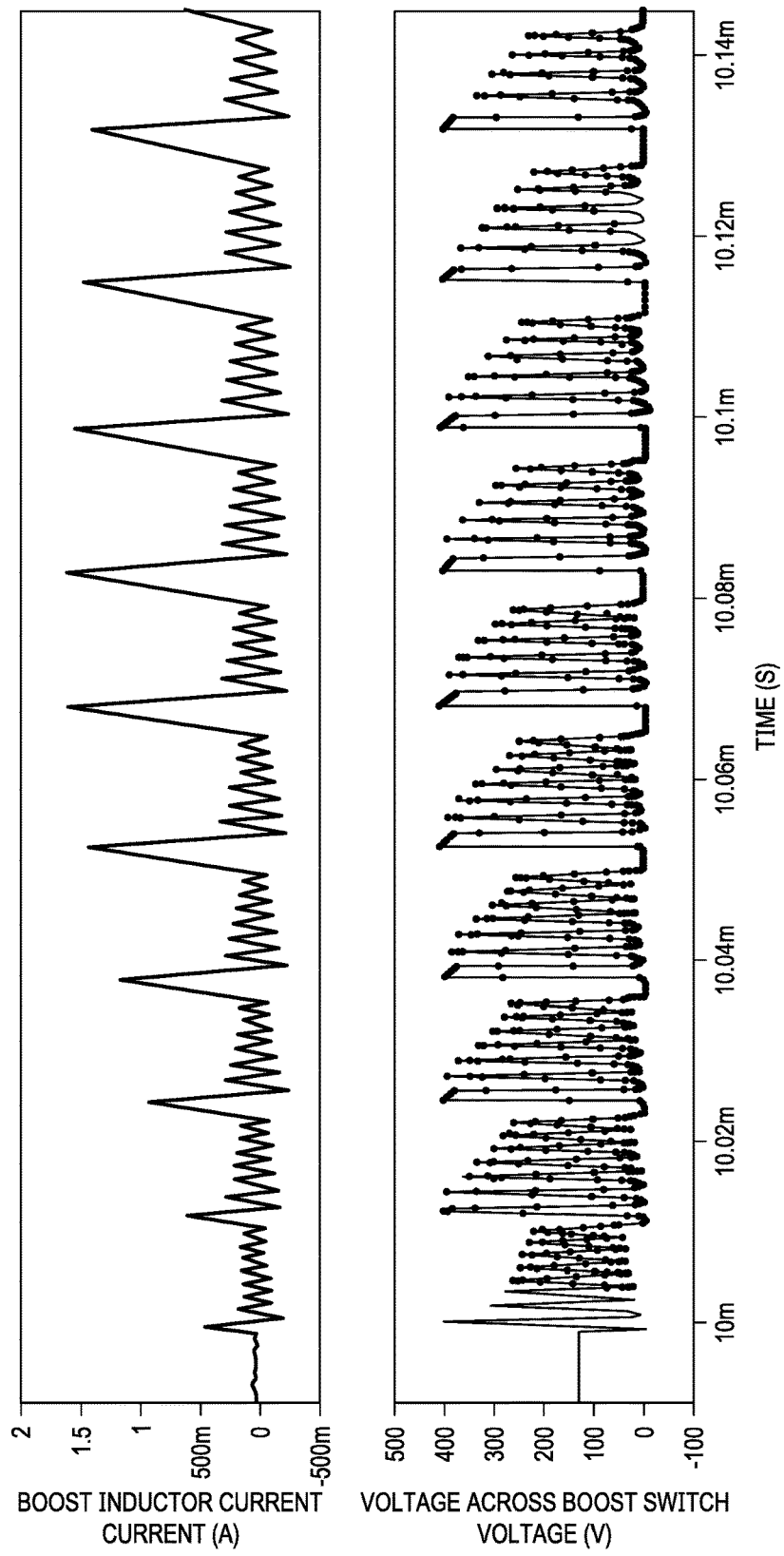
FIG. 6 shows results from simulations from the operation of the boost converter in the application schematic shown in FIG. 5.

Results obtained from an actual switching converter circuit are shown in FIG. 6 that were measured by an oscilloscope as waveforms covering a SoftStart period for the circuit shown in the switching converter 500 application schematic in FIG. 5. The DRV pin provides a $V_{GS}$ waveform (see FIG. 4B) that is coupled to the control node 521a (e.g., gate) that controls the power switch 521 so that for an n-channel power MOSFET when the $V_{GS}$ waveform is high the power switch is ON ($T_{ON}$ period) when the VGS waveform is low the power switch is OFF.

During switching converter operation, the inductor current (shown as boost inductor current) ramps up during the $T_{ON}$ period corresponding to the VGS pulses because the input voltage $V_{IN}$ is applied across the inductor. The inductor current ramps down during the $T_{OFF}$ period. This is because the (output voltage−input voltage) is applied across the inductor as current is forced to flow through the output diode (see Dbst shown in FIG. 5). When the inductor current becomes zero the power switch is turned ON again to start a new switching cycle.

The simulations shown clearly evidence disclosed SoftStart operation. The SoftStart period will occur at the start of each Burst ON period. The upper trace in FIG. 6 shows the boost inductor current waveform. During the $T_{ON}$ period the inductor current ramps up linearly. During the TDCH period the inductor current ramps down linearly. During the TDCM period the inductor current remains close to zero. There is some resonant oscillation that occurs during this period.

Over the first four switching cycle the peak inductor current ramps up to its demanded value. The cycle average of this inductor current waveform will represent the line current that will ramp up over the first four switching cycles. The lower trace shows the voltage across the boost power switch which is generally a MOSFET switch, shown as power switch 521 in FIG. 5 described above.

During the $T_{ON}$ period the voltage across the MOSFET switch is close to zero. During the TDCH period the voltage across the MOSFET is high, and this voltage is equal to the voltage on the output capacitor (see CBlk in FIG. 5). During the TDCM period the average voltage across the MOSFET is equal to the voltage on the input capacitor (see $C_{In}$ in FIG. 5). The voltage across the power switch 521 again has a resonant oscillation.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A controller comprising:
    an error amplifier configured to generate a power demand signal based on a difference between a sensed output voltage and a regulation voltage;
    a multiplexer coupled to the error amplifier, and configured to generate an adjusted power demand signal based on a counter signal, the adjusted power demand signal having an adjusted voltage divided from the power demand signal; and
    a burst mode controller coupled to the multiplexer, and configured to generate the counter signal based on a comparison of the power demand signal against a boost threshold signal.

2. The controller of claim 1, wherein the multiplexer includes:
    a voltage divider having:
    a first node coupled to an amplifier output of the error amplifier to receive the power demand signal;
    a second node;
    a first resistor coupled between the first and second nodes; and
    a second resistor coupled between the second node and a ground terminal.

3. The controller of claim 2, wherein the first resistor has a first resistance, and the second resistor has a second resistance three times of the first resistance.

4. The controller of claim 2, wherein the first resistor has a first resistance, and the second resistor has a second resistance the same as the first resistance.

5. The controller of claim 2, wherein the first resistor has a first resistance, and the second resistor has a second resistance one third of the first resistance.

6. The controller of claim 2, wherein the multiplexer includes:
a switching network having:
a first switch coupled between the first node and a multiplexer output of the multiplexer; and
a second switch coupled between the second node and the multiplexer output of the multiplexer.

7. The controller of claim 6, wherein the multiplexer includes:
a decoder configured to close the first switch based on a first value of the counter signal, and close the second switch based on a second value of the counter signal.

8. The controller of claim 7, wherein the first value is higher than the second value.

9. The controller of claim 1, wherein:
the boost threshold signal includes a boost fall threshold; and
the burst mode controller is configured to reduce a value of the counter signal when a demand voltage of the power demand signal is less than the boost fall threshold.

10. The controller of claim 1, wherein:
the boost threshold signal includes a boost rise threshold; and
the burst mode controller is configured to increase a value of the counter signal when a demand voltage of the power demand signal is greater than the boost fall threshold.

11. The controller of claim 1, wherein:
the boost threshold signal includes a boost fall threshold; and
the burst mode controller is configured to assign a soft-stop value to the counter signal when a demand voltage of the power demand signal is less than the boost fall threshold.

12. The controller of claim 1, wherein:
the boost threshold signal includes a boost rise threshold; and
the burst mode controller is configured to assign a soft-start value to the counter signal when a demand voltage of the power demand signal is greater than the boost fall threshold.

13. A controller comprising:
an error amplifier configured to generate a power demand signal based on a difference between a demand voltage of the sensed output voltage and a regulation voltage;
a multiplexer coupled to the error amplifier, and configured to generate an adjusted power demand signal having an adjusted voltage divided from the demand voltage corresponding to either a soft-start state or a soft-stop state; and
a burst mode controller coupled to the multiplexer, and configured to:
enter the soft-stop state when the demand voltage is less than the boost fall threshold; and
enter the soft-start state when the demand voltage is greater than the boost fall threshold.

14. The controller of claim 13, wherein the multiplexer includes:
a first node configured to receive a first adjusted voltage approximating the demand voltage;
a second node configured to receive a second adjusted voltage approximating three quarters of the demand voltage;
a third node configured to receive a third adjusted voltage approximating one half of the demand voltage; and
a fourth node configured to receive a fourth adjusted voltage approximating one fourth of the demand voltage.

15. The controller of claim 14, wherein the multiplexer includes a multiplexer output configured to output the adjusted power demand signal, and the multiplexer includes:
a first switch coupled between the first node and the multiplexer output;
a second switch coupled between the second node and the multiplexer output;
a third switch coupled between the third node and the multiplexer output; and
a fourth switch coupled between the fourth node and the multiplexer output.

16. The controller of claim 15, wherein the multiplexer is configured to:
close the first switch based on a first counter value corresponding to either the soft-start state or the soft-stop state;
close the second switch based on a second counter value corresponding to either the soft-start state or the soft-stop state;
close the third switch based on a third counter value corresponding to either the soft-start state or the soft-stop state; and
close the fourth switch based on a fourth counter value corresponding to either the soft-start state or the soft-stop state.

17. The controller of claim 16, wherein the first value is higher than the second value, the second value is higher than the third value, and the third value is higher than the fourth value.

18. A controller comprising:
an error amplifier configured to generate a power demand signal based on a difference between a demand voltage of the sensed output voltage and a regulation voltage;
a multiplexer coupled to the error amplifier, and having:
a multiplexer output;
a first node configured to receive a first voltage as a first fraction of the demand voltage;
a second node configured to receive a second voltage as a second fraction of the demand voltage, the second fraction lower than the first fraction;
a first switch coupled between the first node and the multiplexer output; and
a second switch coupled between the second node and the multiplexer output; and
a burst mode controller coupled to the multiplexer, and configured to generate a counter signal for controlling the first and second switches based on a difference between the power demand signal and a boost threshold signal.

19. The controller of claim 18, wherein:
the boost threshold signal includes a boost fall threshold; and
the burst mode controller is configured to reduce a value of the counter signal when the demand voltage is less than the boost fall threshold.

20. The controller of claim 18, wherein:
the boost threshold signal includes a boost rise threshold; and
the burst mode controller is configured to increase a value of the counter signal when the demand voltage is greater than the boost fall threshold.

* * * * *